US011368122B2

(12) United States Patent
Shao et al.

(10) Patent No.: US 11,368,122 B2
(45) Date of Patent: Jun. 21, 2022

(54) PASSIVE TERMINAL ANTI-STOP CIRCUIT, PASSIVE TERMINAL ANTI-STOP SYSTEM COMPOSED OF IT AND ANTI-STOP METHOD

(71) Applicant: Beijing sanyuan wellhope agriculture technology co. LTD, Beijing (CN)

(72) Inventors: Caimei Shao, Beijing (CN); Qianhai Yang, Beijing (CN); Wenyu Li, Beijing (CN); Genlai Li, Beijing (CN); Yajing Sun, Beijing (CN); Penggang Feng, Beijing (CN); Shaoyong Guo, Beijing (CN); Weiwu Shen, Beijing (CN); Weijie Feng, Beijing (CN); Yan Liu, Beijing (CN)

(73) Assignee: Beijing sanyuan wellhope agriculture technology co, Beijing (CN)

( * ) Notice: Subject to any disclaimer, the term of this patent is extended or adjusted under 35 U.S.C. 154(b) by 0 days.

(21) Appl. No.: 16/924,942

(22) Filed: Jul. 9, 2020

(65) Prior Publication Data
US 2021/0091707 A1 Mar. 25, 2021

(51) Int. Cl.
*H02P 31/00* (2006.01)
*B65G 23/22* (2006.01)

(52) U.S. Cl.
CPC .............. *H02P 31/00* (2013.01); *B65G 23/22* (2013.01)

(58) Field of Classification Search
CPC ...................................................... H02P 31/00
See application file for complete search history.

(56) References Cited

U.S. PATENT DOCUMENTS

| 4,088,226 | A | * | 5/1978 | Vlcek | B65H 67/064 198/487.1 |
| 7,486,489 | B2 | | 2/2009 | Dragoi et al. | |
| 2008/0282789 | A1 | * | 11/2008 | Regis | G01M 17/02 73/146 |
| 2016/0185146 | A1 | * | 6/2016 | McNestry | B41J 33/16 242/597.1 |

FOREIGN PATENT DOCUMENTS

| CN | 202784730 U | 3/2013 |
| CN | 203635139 U | 6/2014 |
| CN | 106679974 A | 5/2017 |
| EP | 3396692 A1 | 10/2018 |

* cited by examiner

*Primary Examiner* — Rina I Duda

(57) ABSTRACT

The present invention discloses an anti-stalling circuit, an anti-stalling system composed of same and an anti-stalling method. The anti-stalling circuit includes a motor main circuit and a control circuit; the anti-stalling system includes a substrate rotating synchronously with a passive end and the passive end anti-stalling circuit, the substrate is provided with a notch, the angle of the notch ranges from 150° to 170°, and the proximity switch SQ1 and the proximity switch SQ2 are installed at 180° on both sides of the substrate; and the passive end anti-stalling method is applied to the passive end anti-stalling system. The present invention can greatly reduce the probability of major failures caused by the stalling of a passive end of drive equipment at a limited cost.

10 Claims, 3 Drawing Sheets

PASSIVE TERMINAL ANTI-STOP CIRCUIT, PASSIVE TERMINAL ANTI-STOP SYSTEM COMPOSED OF IT AND ANTI-STOP METHOD

CROSS REFERENCE TO RELATED APPLICATION

This application claims priority of Chinese Application No. 2020102856445 filed on Apr. 14, 2020 and entitled "passive end anti-stalling circuit, passive end anti-stalling system composed of same and passive end anti-stalling method".

FIELD OF THE INVENTION

The present invention relates to the field of operation monitoring of transmission equipment, in particular to an anti-stalling circuit for passive end of drive equipment, an anti-stalling system composed of same and an anti-stalling method for passive end of drive equipment.

BACKGROUND OF THE INVENTION

Transmission (drive equipment) includes a driving wheel, a non-driven wheel and a conveyor belt, wherein the non-driven wheel may also be called a tail wheel or a passive end. During operation, the driving wheel is connected to a motor, the motor drives the driving wheel to rotate. The conveyor belt is arranged on the driving wheel and the non-driven wheel, and the rotation of the driving wheel drives the conveyor belt to move, thereby driving the non-driven wheel to rotate.

In various machinery production scenarios, the above-mentioned transmission equipment needs to be applied. It is easy to be detect the failure of the driving wheel or the motor, but the failure of the tail wheel cannot be easily detected due to the excessive distance with the driving wheel. For production workshops and other occasions, if such failures cannot be discovered in time, it is easy to cause accidents.

For example, due to the slipping of an elevator belt, the belt breaks, and the main chain of a scraper machine breaks, causing the machine head to entangle. These phenomena that the passive end does not rotate due to the failure of a transmission structure, which in turn leads to greater failure, are very common in feed factories.

As another example, taking a bucket elevator as an example, when the tail wheel stalls, if it is not discovered in time, and the bucket elevator is not stopped in time, it means a sudden production stagnation, which brings adverse effects to raw material supply, product quality and the like. The downtime and maintenance time, as well as the labor cost of maintenance personnel and the material cost, are undoubtedly major losses for companies with busy production.

In order to realize the anti-stalling detection of the passive end of the transmission equipment, the following related documents are disclosed in the prior art.

The Chinese patent application CN202784730 U discloses a detection and alarm device of belt slipping. An iron plate with a fixed size is installed on a belt tail wheel, a detection device is installed on a tail wheel base, the detection device includes a proximity switch, a time relay or the like, and the installation distance between the iron plate and the detection device is 10-20 mm; and the detection device is connected to an alarm and is powered on. When the belt is running, a belt running point is closed, a timing unit is running in a timing state, the iron plate on the belt tail wheel rotates with the belt tail wheel, the iron plate approaches to the proximity switch once for each circle of rotation, under the influence of the iron plate, the proximity switch is turned on once, and the time relay resets and automatically performs zero clearing. When the belt slips, the belt cannot drive the tail wheel to rotate, the iron plate will not affect the proximity switch, the time relay cannot reset within a set time, the time relay outputs a signal at the arrival of the set time, and simultaneously emits an audible and visual alarm signal and controls the belt to stop running.

The Chinese patent application CN106679974 A discloses a rear wheel stalling alarm system of transmission equipment. It includes a circular plate, a proximity switch, a PLC and an alarm; two notches are formed in the on the periphery of the plate surface of the circular plate, the two notches are formed oppositely along the same diameter of the plate surface, and the circular plate is connected to a tail wheel of the transmission equipment in a shaft connection manner; the proximity switch is arranged on the periphery of the circular plate, switching value signals and counting of the proximity switch are collected by the PLC, if a time interval between the current switching value signal and the previous switching value signal is greater than or equal to a preset interval, the current switching value signal is counted again; and the counting result corresponding to the previous switching value signal is used as detection result data, and an alarm signal is output to the alarm when the detection result data is greater than a preset value.

The Chinese patent application CN203635139 U discloses a stirring shaft type stalling alarm device. The device includes a proximity switch, an intermediate relay, a time relay and an alarm, the proximity switch is connected to the intermediate relay, the intermediate relay is connected to one end of the time relay, and the other end of the time relay is connected to the alarm.

SUMMARY OF THE INVENTION

The inventors of the present invention found that, for the equipment in which an electrical control system is integrated in a central control PLC (Programmable Logic Controller) control cabinet, anti-stalling function of the passive end can be integrated in a control program, which is easier to implement and less difficult. For single equipment without a PLC control system, to implement the passive end anti-stalling function, a separate PLC control system needs to be configured, which is expensive.

In response to the above-mentioned problems, the present invention provides an anti-stalling circuit, an anti-stalling system composed of the same, and an anti-stalling method, in order to greatly reduce the probability of major failures caused by the stalling of a passive end of equipment at a limited cost.

One purpose of the present application is to solve the passive end anti-stalling control problem of low-speed single equipment (such as a bucket elevator, a scraper conveyor, a belt conveyor and other equipment in which the rotating speeds of the passive ends are less than 2 rpm) through cost as low as possible.

The present invention provides an anti-stalling circuit, including a motor main circuit and a control circuit, the motor main circuit includes a motor M, and a thermal relay FR, a normally open point of a main contact of a contactor KM and a circuit breaker QF, which are connected to the motor M, the control circuit includes a start and stop circuit and a stalling protection circuit, the start and stop circuit includes a fuse FU, a stop button SB1, a normally closed point of an intermediate relay KA3, a start button SB2, a normally closed point of a thermal relay FR and a coil of contactor KM, which are arranged in series, and a normally open point of an auxiliary contact of the contactor KM connected in parallel with the start button SB2, the stalling protection circuit includes an intermediate relay KA1, an intermediate relay KA2, a coil of an intermediate relay KA3, a delay relay KT1, a delay relay KT2, a proximity switch SQ1 and a proximity switch SQ2, the delay relay KT1 and the delay relay KT2 are respectively connected in series with the normally open point of the intermediate relay KA1 and the normally open point of the intermediate relay KA2, and then are connected in parallel, the proximity switch SQ1 and the proximity switch SQ2 are respectively connected to the coil of the intermediate relay KA1 and the coil of the intermediate relay KA2, and then are in parallel, and a delay closing point of the delay relay KT1 and the delay closing point of the delay relay KT2 are connected in parallel, and then are connected with the coil of the intermediate relay KA3 in series.

Further, an anti-stalling system composed of the above circuit is provided. The anti-stalling system includes a substrate rotating synchronously with a passive end and the passive end anti-stalling circuit described in any one of the above items, the substrate is provided with a notch, the angle of the notch ranges from 150° to 170°, and the proximity switch SQ1 and the proximity switch SQ2 are installed at 180° on both sides of the substrate.

The above anti-stalling circuit and the anti-stalling system are used for passive end of a transmission equipment.

An anti-stalling method is applied to the passive end anti-stalling system described in any one of the above items, and includes the following steps:

Step 1, mounting the passive end anti-stalling system;

step 2, setting the stalling delay time of the delay relay KT1 and the delay relay KT2;

step 3, detecting the substrate through the proximity switch SQ1 and the proximity switch SQ2:

when the passive end of the equipment is running normally, the proximity switch SQ1 and the proximity switch SQ2 periodically detect the substrate, periodically energize/deenergize the coil of the intermediate relay KA1 and the coil of the intermediate relay KA2, respectively, periodically close/disconnect the normally open point of the intermediate relay KA1 and the normally open point of the intermediate relay KA2, and periodically perform power-on/power-off on the delay relay KT1 and the delay relay KT2, at this time, the running/rotating speed indicator light H1 flashes periodically, and when the delay relay KT1 and the delay relay KT2 are powered off, the stalling delay time thereof can be reset;

when the passive end of the equipment stalls, the substrate is stationary, one of the proximity switch SQ1 and the proximity switch SQ2 continuously detects the substrate, and correspondingly enables one of the coil of the intermediate relay KA1 and the coil of the intermediate relay KA2 to be energized, correspondingly enables one of the normally open point of the intermediate relay KA1 and the normally open point of the intermediate relay KA2 to be continuously closed, and correspondingly supplies power to one of the delay relay KT1 and the delay relay KT2 continuously, when the duration of the continuous power supply of one of the delay relay KT1 and the delay relay KT2 reaches the stalling delay time, the delay closing point of the corresponding delay relay is closed, the coil of the intermediate relay KA3 is energized, the normally open point of the intermediate relay KA3 is closed to form self-locking to maintain an energized state of the coil, the normally closed point of the intermediate relay KA3 is disconnected to deenergize the coil of the contactor KM, so as to cause the motor to stall, and at this time, the stalling failure alarm light H2 is continuously lightened; and step 4, when the stalling of the passive end of the equipment causes the intermediate relay KA3 to trigger a stalling protection action, the passive end anti-stalling system can only be reset by pressing the stalling reset button SB3.

The beneficial effects of the present invention are as follows:

The present invention can greatly reduce the probability of major failures caused by the stalling of the passive end of the equipment. With respect to the cost, in addition to the original control elements of the motor main circuit, the control elements that need to be added to implement the present invention include 2 proximity switches, 2 delay relays, 3 intermediate relays, 2 indicator lights, necessary cables, an electrical box, and the total cost can be controlled within 1,000 yuan along with the installation cost.

When the passive end of the equipment stalls, the iron ring is stationary, the iron ring with the angle of the notch less than 180° and the proximity switches installed at 180° ensure that at least one proximity switch is at the physical position of the iron ring, so as to continuously supply power to one of the delay relay KT1 and the delay relay KT2, when the duration reaches the set stalling delay time (flexibly set/adjusted according to the stalling time that the equipment can bear), the action is triggered to close the delay closing point of the corresponding delay relay and to energize the coil of the intermediate relay KA3, moreover, the self-locking is formed by closing the normally open point of the intermediate relay KA3, and the normally closed point of the intermediate relay KA3 is disconnected to deenergize the coil of the contactor KM, so that the motor stalls to prevent major failures caused by the stalling of the passive end of the equipment.

When the equipment is running normally, the iron ring with the notch periodically triggers the proximity switch SQ2, and the proximity switch SQ2 periodically supplies power to the running/rotating speed indicator light H1 through the intermediate relay KA2. Therefore, whether the passive end of the equipment is rotating can be observed from the blinking state of the running/rotating speed indicator light H1: if the running/rotating speed indicator light H1 is always on and is not blinking, it means that the passive end stops rotating; if the running/rotating speed indicator light H1 is always off and is not blinking, the passive end may stop rotating or the proximity switch SQ2 or the intermediate relay KA2 of the detection element may also malfunction, and overhauling may be disposed; and an experienced operator can judge whether the rotating speed of the passive end is normal or not through the blinking speed of the running/rotating speed indicator light H1.

When the intermediate relay KA3 triggers the action due to stalling, the stalling failure alarm light H2 is continuously turned on, which indicates that the present stalling of the motor is not caused by other reasons (for example, the fusing of the fuse FU caused by overloading, the action of the thermal relay FR caused by overloading of the motor, artificial shutdown or the like), but is caused by the stalling of the passive end, so that it is convenient for the operator and the maintenance personnel to accurately judge the failure. The stalling failure alarm light H2 can be set as an audible and visual alarm, which can alert the operator within a large range and a longer distance.

At the same time, the passive end anti-stalling circuit prevents the operator from starting the equipment again by pressing the start button SB2 via the self-locking of the intermediate relay KA3, and the operator can only start the equipment again by pressing the stalling reset button SB3 to destroy the self-locking of the intermediate relay KA3. The stalling reset button SB3 can be installed at a location away from the onsite operator, and only after the maintenance personnel repairs the equipment, the maintenance personnel can reset the equipment, thereby avoiding safety accidents caused by wrong starting operations.

BRIEF DESCRIPTION OF THE DRAWINGS

The present invention will be further described below with reference to the drawings and specific embodiments.

Figure 1:
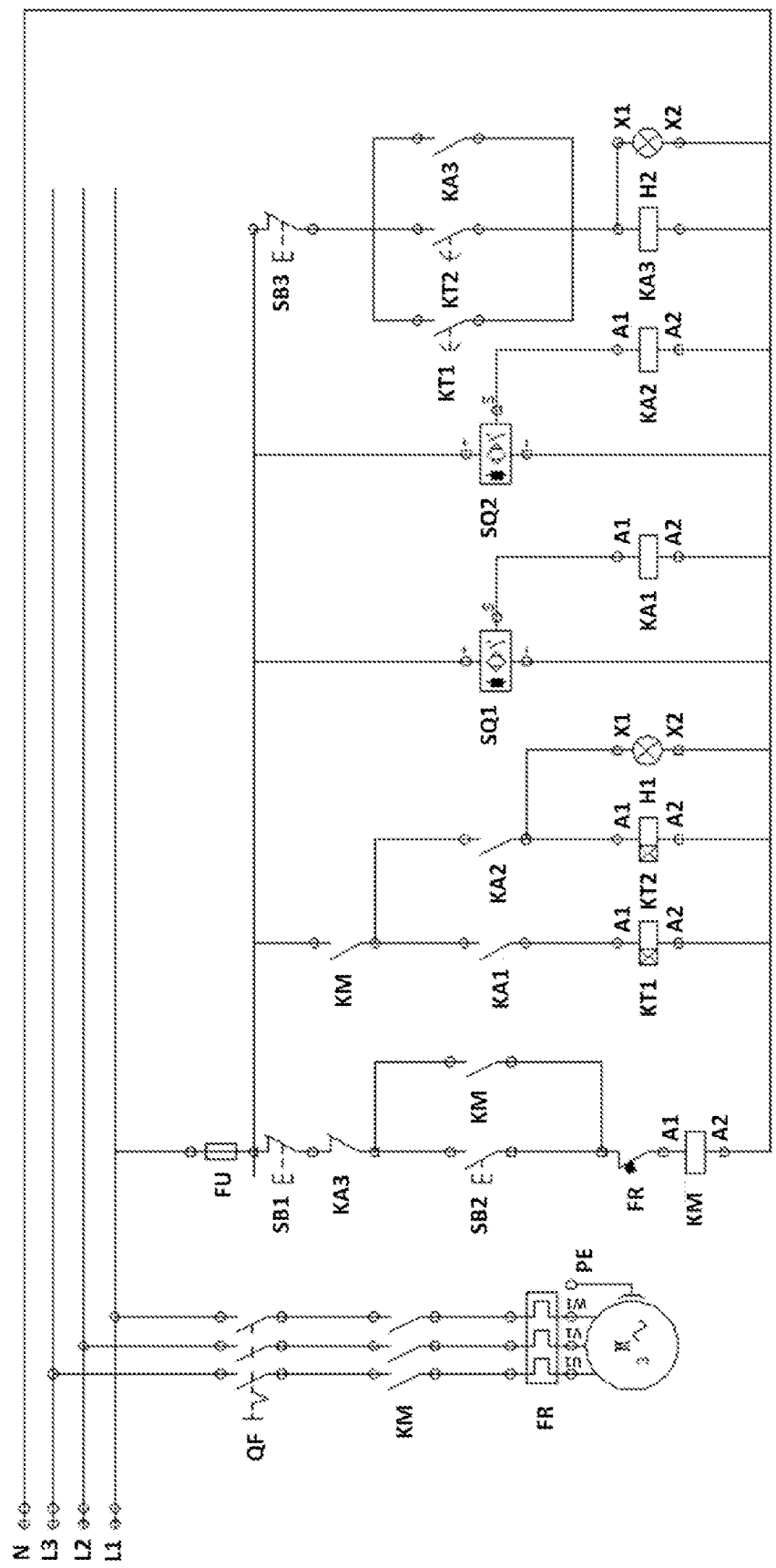
FIG. 1 is a structural schematic diagram of an anti-stalling circuit of the present invention.

M—motor; FR—thermal relay; KM—contactor; QF—circuit; FU—fuse; SB1—stop button; SB2—start button; SB3—stalling reset button; KA1,KA2, KA3—intermediate relay; KT1, KT2—delay relay; H1—running/rotating speed indicator light; H2—stalling failure alarm light; N—naught line; L—firing line; PE—earth wire; A1, A2, A12, A 22, A 13, A23, A 14, A 24, A 15, A 25—terminal; X1, X2, X12, X 22—terminal.

DETAILED DESCRIPTION OF THE EMBODIMENTS

A clear and complete description of technical solutions in the embodiments of the present invention will be given below, in combination with the drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, fall into the protection scope of the present invention.

In the present invention, unless otherwise clearly specified and limited, the terms "arrangement", "installation", "connected", "connection", "fixed" and other terms should be understood in a broad sense, for example, it can be a fixed connection and can also be a detachable connection; it can be a mechanical connection; and it can be directly connected or indirectly connected through an intermediate medium. Those of ordinary skill in the art can understand the specific meanings of the above terms in the present invention according to specific situations.

The present invention provides an anti-stalling circuit, including a motor main circuit and a control circuit, the motor main circuit includes a motor M, and a thermal relay FR, a normally open point KM1 of a main contact of a contactor KM and a circuit breaker QF, which are connected to the motor M, the control circuit includes a start and stop circuit and a stalling protection circuit, the start and stop circuit includes a fuse FU, a stop button SB1, a normally closed point KA31 of an intermediate relay KA3, a start button SB2, a normally closed point FR2 of a thermal relay FR and a coil of contactor KM, which are arranged in series, and a normally open point KM3 of an auxiliary contact of the contactor KM connected in parallel with the start button SB2, the stalling protection circuit includes a normally open point KM4 of an auxiliary contact of the contactor KM, an intermediate relay KA1, an intermediate relay KA2, a coil KA33 of an intermediate relay KA3, a delay relay KT1, a delay relay KT2, a proximity switch SQ1 and a proximity switch SQ2, the delay relay KT1 and the delay relay KT2 are respectively connected in series with the normally open point KA11 of the intermediate relay KA1 and the normally open point KA21 of the intermediate relay KA2, and then are connected in parallel, the proximity switch SQ1 and the proximity switch SQ2 are respectively connected to the coil KA12 of the intermediate relay KA1 and the coil KA22 of the intermediate relay KA2, and then are in parallel, and a delay closing point KT12 of the delay relay KT1 and the delay closing point KT22 of the delay relay KT2 are connected in parallel, and then are connected with the coil KA33 of the intermediate relay KA3 in series.

Further, the delay closing point KT12 of the delay relay KT1 and the delay closing point KT22 of the delay relay KT2 are connected in parallel, and then are connected in parallel with the normally open point KA32 of the intermediate relay KA3.

Further, the delay closing point KT12 of the delay relay KT1 and the delay closing point KT22 of the delay relay KT2 are connected in parallel with the normally open point KA32 of the intermediate relay KA3, and then are connected in series with a stalling reset button SB3.

Further, the coil KA33 of the intermediate relay KA3 is connected in parallel with a stalling failure alarm light H2.

Further, the delay relay KT2 is connected in parallel with a running/rotating speed indicator light H1.

A passive end anti-stalling system includes a substrate rotating synchronously with a passive end and the passive end anti-stalling circuit described in any one of the above items, the substrate is provided with a notch, the angle of the notch ranges from 150° to 170°, and the proximity switch SQ1 and the proximity switch SQ2 are installed at 180° on both sides of the substrate.

Further, the substrate is an iron ring with a notch, and the diameter of the iron ring is not less than 50 mm.

Further, the above anti-stalling system are used for passive end of a transmission equipment, the rotating speed of the passive end is not higher than 2 rpm.

Further, when the rotating speed of the passive end is higher than 2 rpm, a transmission deceleration structure is arranged between the passive end and the substrate.

A passive end anti-stalling method is applied to the passive end anti-stalling system described in any one of the above items, and includes the following steps:

Step 1, mounting the passive end anti-stalling system;

step 2, setting the stalling delay time of the delay relay KT1 and the delay relay KT2;

step 3, detecting the substrate through the proximity switch SQ1 and the proximity switch SQ2:

when the passive end of the equipment is running normally, the proximity switch SQ1 and the proximity switch SQ2 periodically detect the substrate, periodically energize/deenergize the coil (KA12) of the intermediate relay KA1 and the coil (KA22) of the intermediate relay KA2, respectively, periodically close/disconnect the normally open point (KA11)_of the intermediate relay KA1 and the normally open point (KA21) of the intermediate relay KA2, and periodically perform power-on/power-off on the delay relay KT1 and the delay relay KT2, at this time, the running/rotating speed indicator light H1 flashes periodically, and when the delay relay KT1 and the delay relay KT2 are powered off, the stalling delay time thereof can be reset;

when the passive end of the equipment stalls, the substrate R is stationary, one of the proximity switch SQ1 and the proximity switch SQ2 continuously detects the substrate, and correspondingly enables one of the coil (KA12) of the intermediate relay KA1 and the coil (KA22) of the intermediate relay KA2 to be energized, correspondingly enables one of the normally open point (KA11) of the intermediate relay KA1 and the normally open point (KA21) of the intermediate relay KA2 to be continuously closed, and correspondingly supplies power to one of the delay relay KT1 and the delay relay KT2 continuously, when the duration of the continuous power supply of one of the delay relay KT1 and the delay relay KT2 reaches the stalling delay time, the delay closing point (KT12, KT22) of the corresponding delay relay is closed, the coil (KA33) of the intermediate relay KA3 is energized, the normally open point (KA32) of the intermediate relay KA3 is closed to form self-locking to maintain an energized state of the coil (KA33), the normally closed point (KA31) of the intermediate relay KA3 is disconnected to deenergize the coil (KM2) of the contactor KM, so as to cause the motor to stall, and at this time, the stalling failure alarm light H2 is continuously lightened; and step 4, when the stalling of the passive end of the equipment causes the intermediate relay KA3 to trigger a stalling protection action, the passive end anti-stalling system can only be reset by pressing the stalling reset button SB3.

The beneficial effects of the present invention are as follows:

The present invention can greatly reduce the probability of major failures caused by the stalling of the passive end of the equipment. With respect to the cost, in addition to the original control elements of the motor main circuit, the control elements that need to be added to implement the present invention include 2 proximity switches, 2 delay relays, 3 intermediate relays, 2 indicator lights, necessary cables, an electrical box, and the total cost can be controlled within 1,000 yuan along with the installation cost.

When the passive end of the equipment stalls, the iron ring R is stationary, the iron ring R with the angle α of the notch less than 180° and the proximity switches installed at 180° ensure that at least one proximity switch is at the physical position of the iron ring, so as to continuously supply power to one of the delay relay KT1 and the delay relay KT2, when the duration reaches the set stalling delay time (flexibly set/adjusted according to the stalling time that the equipment can bear), the action is triggered to close the delay closing point of the corresponding delay relay and to energize the coil KA33 of the intermediate relay KA3, moreover, the self-locking is formed by closing the normally open point KA32 of the intermediate relay KA3, and the normally closed point KA31 of the intermediate relay KA3 is disconnected to deenergize the coil KM2 of the contactor KM, so that the motor M stalls to prevent major failures caused by the stalling of the passive end of the equipment.

When the equipment is running normally, the iron ring R with the notch periodically triggers the proximity switch SQ2, and the proximity switch SQ2 periodically supplies power to the running/rotating speed indicator light H1 through the intermediate relay KA2. Therefore, whether the passive end of the equipment is rotating can be observed from the blinking state of the running/rotating speed indicator light H1: if the running/rotating speed indicator light H1 is always on and is not blinking, it means that the passive end stops rotating; if the running/rotating speed indicator light H1 is always off and is not blinking, the passive end may stop rotating or the proximity switch SQ2 or the intermediate relay KA2 of the detection element may also malfunction, and overhauling may be disposed; and an experienced operator can judge whether the rotating speed of the passive end is normal or not through the blinking speed of the running/rotating speed indicator light H1.

When the intermediate relay KA3 triggers the action due to stalling, the stalling failure alarm light H2 is continuously turned on, which indicates that the present stalling of the motor is not caused by other reasons (for example, the fusing of the fuse FU caused by overloading, the action of the thermal relay FR caused by overloading of the motor, artificial shutdown or the like), but is caused by the stalling of the passive end, so that it is convenient for the operator and the maintenance personnel to accurately judge the failure. The stalling failure alarm light H2 can be set as an audible and visual alarm, which can alert the operator within a large range and a longer distance.

At the same time, the passive end anti-stalling circuit prevents the operator from starting the equipment again by pressing the start button SB2 via the self-locking of the intermediate relay KA3, and the operator can only start the equipment again by pressing the stalling reset button SB3 to destroy the self-locking of the intermediate relay KA3. The stalling reset button SB3 can be installed at a location away from the onsite operator, and only after the maintenance personnel repairs the equipment, the maintenance personnel can reset the equipment, thereby avoiding safety accidents caused by wrong starting operations.

Embodiment 1

Referring to FIG. 1, a passive end anti-stalling circuit includes a motor main circuit and a control circuit.

The motor main circuit includes a motor M, and a thermal relay FR, a normally open point KM1 of a main contact of a contactor KM and a circuit breaker QF, which are connected to the motor M, the control circuit includes a start and stop circuit and a stalling protection circuit, wherein the start and stop circuit includes a fuse FU, a stop button SB1, a normally closed point KA31 of an intermediate relay KA3, a start button SB2, a normally closed point FR2 of a thermal relay FR and a coil KM2 of the contactor KM, which are arranged in series, and a normally open point KM3 of an auxiliary contact of the contactor KM connected in parallel with the start button SB2, the stalling protection circuit includes a normally open point KM4 of an auxiliary contact of the contactor KM, an intermediate relay KA1, an intermediate relay KA2, a coil KA33 of an intermediate relay KA3, a delay relay KT1, a delay relay KT2, a proximity switch SQ1 and a proximity switch SQ2, the delay relay KT1 and the delay relay KT2 are respectively connected in series with the normally open point KA11 of the intermediate relay KA1 and the normally open point KA21 of the intermediate relay KA2, and then are connected in parallel, the proximity switch SQ1 and the proximity switch SQ2 are respectively connected to the coil KA12 of the intermediate relay KA1 and the coil KA22 of the intermediate relay KA2, and then are in parallel, and a delay closing point KT12 of the delay relay KT1 and the delay closing point KT22 of the delay relay KT2 are connected in parallel, and then are connected with the coil KA33 of the intermediate relay KA3 in series.

Further, the delay closing point KT12 of the delay relay KT1 and the delay closing point KT22 of the delay relay KT2 are connected in parallel, and then are connected in parallel with the normally open point KA32 of the intermediate relay KA3.

Further, the delay closing point KT12 of the delay relay KT1 and the delay closing point KT22 of the delay relay KT2 are connected in parallel with the normally open point KA32 of the intermediate relay KA3, and then are connected in series with a stalling reset button SB3.

The working principle of the passive end anti-stalling circuit is as follows: When the equipment is started, the start button SB2 is pressed down, the normally open point of the start button SB2 is closed, an L1 phase supplies power to the coil KM2 of the contactor KM of the motor through the fuse FU, the normally closed point of the stop button SB1, the normally closed point KA31 of the intermediate relay KA3, the normally open point of the start button SB2 and the thermal relay FR, the normally open point KM1 of the main contact of the contactor KM is closed, and the motor runs. At the same time, the normally open point[s] KM3, KM4 of the auxiliary contact of the contactor KM are closed, after the start button SB2 is released, the L1 phase realizes self-locking through the normally open point[s] KM3, KM4 of the auxiliary contact of the contactor KM that is connected in parallel with the start button SB2, so a[s] to continuously supply power to the coil KM2 of the contactor KM, so that the motor M can continue to run.

In the case of Artificial shutdown, the stop button SB1 is pressed down, the coil of the contactor KM coil is deenergized, and the motor stalls.

At the same time, if the fuse FU is fused due to the overloading of the control circuit, or the thermal relay FR acts due to the overloading of the motor (the normally closed point FR2 of the FR is disconnected), or the intermediate relay KA3 acts (the normally closed point KA31 of the KA3 is disconnected), the coil KM2 of the contactor KM coil is also deenergized, such that the motor stalls.

The intermediate relay KA3 is an output element triggering the stalling protection.

After the passive end anti-stalling circuit causes the intermediate relay KA3 to trigger the stalling protection action and realizes self-locking through the proximity switch SQ1 and the proximity switch SQ2, the operator cannot start the equipment again by pressing the start button SB2, and can only start the equipment again by pressing the stalling reset button SB3 to destroy the self-locking of the intermediate relay KA3. The stalling reset button SB3 can be installed at a location away from the onsite operator, and only after the maintenance personnel repairs the equipment, the maintenance personnel can reset the equipment, thereby avoiding safety accidents caused by wrong starting operations.

Further, the coil of the intermediate relay KA3 is connected in parallel with a stalling failure alarm light H2, and the delay relay KT2 is connected in parallel with a running/rotating speed indicator light H1.

Embodiment 2

Figure 2:
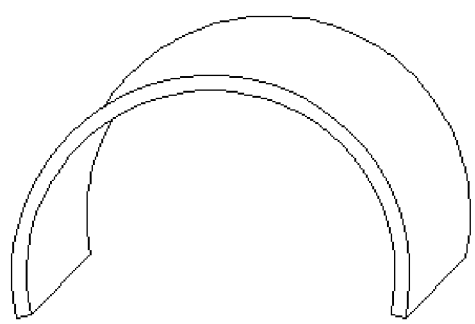
FIG. 2 is a structural schematic diagram of a substrate of the present invention.
Figure 3:
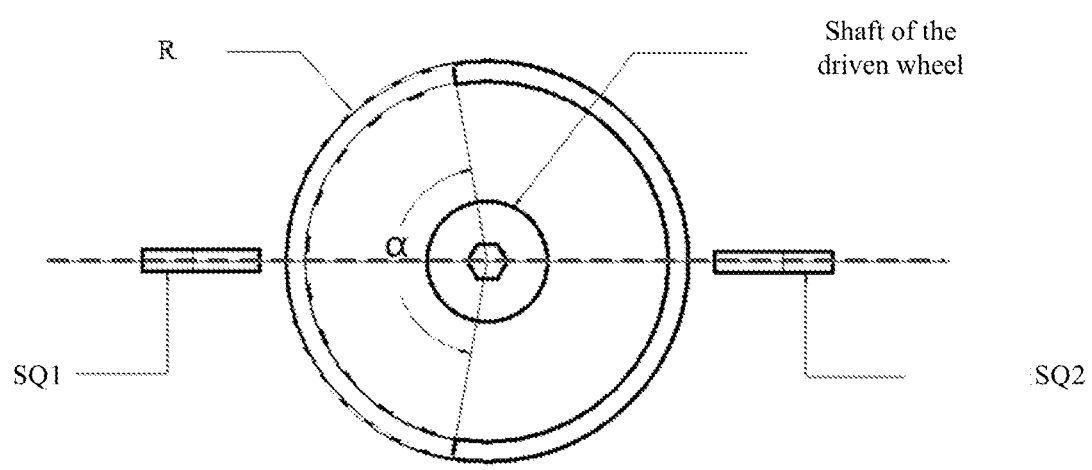
FIG. 3 shows the proximity switches and the notch according to one embodiment.

A passive end anti-stalling system includes a substrate R rotating synchronously with a passive end and the passive end anti-stalling circuit in embodiment 1, referring to FIG. 2, the substrate is provided with a notch, the substrate and the passive end are coaxially installed, the angle α of the notch ranges from 150° to 170°, and the proximity switch SQ1 and the proximity switch SQ2 are installed at 180° on both sides of the substrate in the diameter direction of the substrate and are close to the substrate.

Further, the substrate is an iron ring R with a notch, and the diameter of the iron ring is not less than 50 mm.

When the passive end of the equipment stalls, the iron ring is stationary, the iron ring with the angle α of the notch less than 180° and the proximity switches installed at 180° ensure that at least one proximity switch is at the physical position of the iron ring, so as to continuously supply power to one of the delay relay KT1 and the delay relay KT2, when the duration reaches the set stalling delay time (flexibly set/adjusted according to the stalling time that the equipment can bear), the action is triggered to close the delay closing point of the corresponding delay relay and to energize the coil of the intermediate relay KA3, moreover, the self-locking is formed by closing the normally open point of the intermediate relay KA3, and the normally closed point of the intermediate relay KA3 is disconnected to deenergize the coil of the contactor KM, so that the motor stalls to prevent major failures caused by the stalling of the passive end of the equipment.

The system is suitable for equipment in which the rotating speed of the passive end is not higher than 2 rpm. There is a time process to suck and release the coils of the adopted intermediate relays and the delay relays, so if the rotating speed is too high, the intermediate relays and the delay relays may buzz and fail. For medium and high speed equipment with the rotating speed higher than 2 rpm, a common transmission reducer needs to be additionally configured to reduce the rotating speed of the substrate detection end of the passive end to be lower than 2 rpm.

Embodiment 3

A passive end anti-stalling method is applied to the passive end anti-stalling system in embodiment 2, and includes the following steps:

Step 1, mounting the passive end anti-stalling system;

step 2, setting the stalling delay time of the delay relay KT1 and the delay relay KT2 (flexibly set/adjusted according to the stalling time that the equipment can bear);

step 3, detecting the substrate through the proximity switch SQ1 and the proximity switch SQ2:

when the passive end of the equipment is running normally, the proximity switch SQ1 and the proximity switch SQ2 periodically detect the substrate, periodically energize/deenergize the coil of the intermediate relay KA1 and the coil of the intermediate relay KA2, respectively, periodically close/disconnect the normally open point of the intermediate relay KA1 and the normally open point of the intermediate relay KA2, and periodically perform power-on/power-off on the delay relay KT1 and the delay relay KT2, at this time, the running/rotating speed indicator light H1 flashes periodically, and when the delay relay KT1 and the delay relay KT2 are powered off, the stalling delay time thereof can be reset;

when the passive end of the equipment stalls, the substrate is stationary, one of the proximity switch SQ1 and the proximity switch SQ2 continuously detects the substrate, and correspondingly enables one of the coil of the intermediate relay KA1 and the coil of the intermediate relay KA2 to be energized, correspondingly enables one of the normally open point of the intermediate relay KA1 and the normally open point of the intermediate relay KA2 to be continuously closed, and correspondingly supplies power to one of the delay relay KT1 and the delay relay KT2 continuously, when the duration of the continuous power supply of one of the delay relay KT1 and the delay relay KT2 reaches the stalling delay time, the delay closing point of the corresponding delay relay is closed, the coil of the intermediate relay KA3 is energized, the normally open point of the intermediate relay KA3 is closed to form self-locking to maintain an energized state of the coil, the normally closed point of the intermediate relay KA3 is disconnected to deenergize the coil of the contactor KM, so as to cause the motor to stall, and at this time, the stalling failure alarm light H2 is continuously lightened; and step 4, when the stalling of the passive end of the equipment causes the intermediate relay KA3 to trigger a stalling protection action, the passive end anti-stalling system can only be reset by pressing the stalling reset button SB3.

Embodiment 4

With respect to the passive end anti-stalling system in embodiment 2, when the equipment is running normally, the system can be regarded as an equipment passive end running state indication system or rotating speed indication system.

When the equipment is running normally, the iron ring with the notch periodically triggers the proximity switch SQ2, and the proximity switch SQ2 periodically supplies power to the running/rotating speed indicator light H1 through the intermediate relay KA2.

Therefore, whether the passive end of the equipment is rotating can be observed from the blinking state of the running/rotating speed indicator light H1: if the running/rotating speed indicator light H1 is always on and is not blinking, it means that the passive end stops rotating; if the running/rotating speed indicator light H1 is always off and is not blinking, the passive end may stop rotating or the proximity switch SQ2 or the intermediate relay KA2 of the detection element may also malfunction, and overhauling may be disposed; and an experienced operator can judge whether the rotating speed of the passive end is normal or not through the blinking speed of the running/rotating speed indicator light H1.

Embodiment 5

With respect to the passive end anti-stalling system in embodiment 2, when the equipment stalls, the system can be regarded as an equipment passive end stalling failure analysis system.

When the intermediate relay KA3 triggers the action due to stalling, the stalling failure alarm light H2 is continuously turned on, which indicates that the present stalling of the motor is not caused by other reasons (for example, the fusing of the fuse FU caused by overloading, the action of the thermal relay FR caused by overloading of the motor, artificial shutdown or the like), but is caused by the stalling of the passive end, so that it is convenient for the operator and the maintenance personnel to accurately judge the failure.

The stalling failure alarm light H2 can be set as an audible and visual alarm, which can alert the operator within a large range and a longer distance.

Finally, it should be noted that the above-mentioned descriptions are merely preferred embodiments of the present invention, and are not used for limiting the present invention. Although the present invention has been described in detail with reference to the foregoing embodiments, those skilled in the art can still make modifications to the technical solutions recorded in the foregoing embodiments or make equivalent substitutions to a part of technical features, and any modifications, equivalent substitutions, improvements and the like, made within the spirit and principle of the present invention, shall all fall within the protection scope of the present invention.

What is claimed is:

1. A non-driven wheel anti-stalling circuit, comprising a motor main circuit and a control circuit, the motor main circuit comprises a motor (M), and a thermal relay (FR), a normally open point (KM1) of a main contact of a contactor (KM) and a circuit breaker (QF), connected to the motor (M), wherein the control circuit comprises a start and stop circuit and a stalling protection circuit, the start and stop circuit comprises a fuse (FU), a stop button (SB1), a normally closed point (KA31) of an intermediate relay (KA3), a start button (SB2), a normally closed point (FR2) of a thermal relay (FR) and a coil of contactor (KM), arranged in series circuitry, and a normally open point (KM3) of an auxiliary contact of the contactor (KM) connected in parallel with the start button (SB2), the stalling protection circuit comprises a normally open point (KM4) of an auxiliary contact of the contactor (KM), an intermediate relay (KA1), an intermediate relay (KA2), a coil (KA33) of an intermediate relay (KA3), a delay relay (KT1), a delay relay (KT2), a proximity switch (SQ1) and a proximity switch (SQ2), the delay relay (KT1) and the delay relay (KT2) are respectively connected in series with the normally open point (KA11) of the intermediate relay (KA1) and the normally open point (KA21) of the intermediate relay (KA2), and connected in parallel, the proximity switch (SQ1) and the proximity switch (SQ2) are respectively connected to the coil (KA12) of the intermediate relay (KA1) and the coil (KA22) of the intermediate relay (KA2), and in parallel, and a delay closing point (KT12) of the delay relay (KT1) and the delay closing point (KT22) of the delay relay (KT2) are connected in parallel, and then are connected with the coil (KA33) of the intermediate relay (KA3) in series.

2. The non-driven wheel anti-stalling circuit according to claim 1, wherein the delay closing point (KT12) of the delay relay (KT1) and the delay closing point (KT22) of the delay relay (KT2) are connected in parallel, and then are connected in parallel with the normally open point (KA32) of the intermediate relay (KA3).

3. The non-driven wheel anti-stalling circuit according to claim 2, wherein the delay closing point (KT12) of the delay relay (KT1) and the delay closing point (KT22) of the delay relay (KT2) are connected in parallel with the normally open point (KA32) of the intermediate relay (KA3), and then are connected in series with a stalling reset button (SB3).

4. The non-driven wheel anti-stalling circuit according to claim 1, wherein the coil of the intermediate relay (KA3) is connected in parallel with a stalling failure alarm light (H2).

5. The non-driven wheel anti-stalling circuit according to claim 1, wherein the delay relay (KT2) is connected in parallel with a running/rotating speed indicator light (H1).

6. A non-driven wheel anti-stalling system, comprising a substrate rotating synchronously with a non-driven wheel and the non-driven wheel anti-stalling circuit according to claim 1, wherein the substrate is is an iron ring (R) with a notch, and the diameter of the iron ring is not less than 50 mm, the angle (α) of the notch ranges from 150° to 170°, and the proximity switch (SQ1) and the proximity switch (SQ2) are installed at 180° on both sides of the substrate (R).

7. The non-driven wheel anti-stalling system according to claim 6, wherein the rotating speed of the non-driven wheel is not higher than 2 rpm.

8. A non-driven wheel anti-stalling method used for the anti-stalling system according to claim 6, and comprises the following steps:

Step 1, mounting the non-driven wheel anti-stalling system;

step 2, setting the stalling delay time of the delay relay (KT1) and the delay relay (KT2);

step 3, detecting the substrate through the proximity switch (SQ1) and the proximity switch (SQ2):

when the non-driven wheel of the equipment is running normally, the proximity switch (SQ1) and the proximity switch (SQ2) periodically detect the substrate, periodically energize/deenergize the coil (KA12) of the intermediate relay (KA1) and the coil (KA22) of the intermediate relay (KA2), respectively, periodically close/disconnect the normally open point (KA11) of the intermediate relay (KA1) and the normally open point (KA21) of the intermediate relay (KA2), and periodically perform power-on/power-off on the delay relay (KT1) and the delay relay (KT2), at this time, the running/rotating speed indicator light H1 flashes periodically, and when the delay relay (KT1) and the delay relay (KT2) are powered off, the stalling delay time thereof can be reset;

when the non-driven wheel of the equipment stalls, the substrate is stationary, one of the proximity switch (SQ1) and the proximity switch (SQ2) continuously detects the substrate, and correspondingly enables one of the coil (KA12) of the intermediate relay (KA1) and the coil (KA22) of the intermediate relay (KA2) to be energized, correspondingly enables one of the normally open point (KA11) of the intermediate relay (KA1) and the normally open point (KA21) of the intermediate relay (KA2) to be continuously closed, and correspondingly supplies power to one of the delay relay (KT1) and the delay relay (KT2) continuously, when the duration of the continuous power supply of one of the delay relay (KT1) and the delay relay (KT2) reaches the stalling delay time, the delay closing point of the corresponding delay relay is closed, the coil (KA33) of the intermediate relay (KA3) is energized, the normally open point (KA32) of the intermediate relay (KA3) is closed to form self-locking to maintain an energized state of the coil (KA33), the normally closed point (KA31) of the intermediate relay (KA3) is disconnected to deenergize the coil (KM2) of the contactor KM, so as to cause the motor to stall, and at this time, the stalling failure alarm light (H2) is continuously lightened; and step 4, when the stalling of the non-driven wheel of the equipment causes the intermediate relay (KA3) to trigger a stalling protection action, the non-driven wheel anti-stalling system can only be reset by pressing the stalling reset button (SB3).

9. A non-driven wheel anti-stalling system, comprising a substrate rotating synchronously with a non-driven wheel and the non-driven wheel anti-stalling circuit according to claim 3, wherein the substrate is an iron ring (R) with a notch, and the diameter of the iron ring is not less than 50 mm, the angle ($\alpha$) of the notch ranges from 150° to 170°, and the proximity switch (SQ1) and the proximity switch (SQ2) are installed at 180° on both sides of the substrate.

10. The non-driven wheel anti-stalling system according to claim 9, wherein the rotating speed of the non-driven wheel is not higher than 2 rpm.

* * * * *